United States Patent
Haywood et al.

(10) Patent No.: US 7,364,291 B2
(45) Date of Patent: Apr. 29, 2008

(54) CONTACT LENSES WITH LIGHT BLOCKING RINGS

(75) Inventors: James W. Haywood, Orange Park, FL (US); Larry G. Jones, Apopka, FL (US); Jerry W. Dukes, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 11/427,375

(22) Filed: Jun. 29, 2006

(65) Prior Publication Data

US 2008/0002147 A1    Jan. 3, 2008

(51) Int. Cl.
  *G02C 7/04* (2006.01)
  *G02C 7/10* (2006.01)
(52) U.S. Cl. .................. 351/163; 351/160 R; 351/177
(58) Field of Classification Search .......... 351/160 R, 351/162, 163, 177
  See application file for complete search history.

(56) References Cited

U.S. PATENT DOCUMENTS

| | | | |
|---|---|---|---|
| 3,034,403 A | 5/1962 | Neefe | |
| 4,576,453 A | 3/1986 | Borowsky | |
| 4,707,236 A | 11/1987 | Borowsky | |
| 4,952,046 A | 8/1990 | Stephens et al. | |
| 5,116,884 A | 5/1992 | Gallas | |
| 5,260,727 A | 11/1993 | Oksmann et al. | |
| 5,302,978 A * | 4/1994 | Evans et al. | 351/162 |
| 5,440,359 A | 8/1995 | Block-Malem | |
| 5,617,154 A | 4/1997 | Hoffman | |
| 5,846,547 A | 12/1998 | Cleary | |
| 5,905,561 A | 5/1999 | Lee et al. | |
| 6,062,687 A | 5/2000 | Lofgren-Nisser | |
| 6,305,801 B1 * | 10/2001 | Kerns et al. | 351/162 |
| 6,811,257 B1 | 11/2004 | Lehat | |

FOREIGN PATENT DOCUMENTS

| | | |
|---|---|---|
| WO | 98/44380 A1 | 10/1998 |
| WO | 01/40842 A1 | 6/2001 |

* cited by examiner

*Primary Examiner*—Scott J. Sugarman
*Assistant Examiner*—Darryl J. Collins
(74) *Attorney, Agent, or Firm*—Lois Gianneschi

(57) ABSTRACT

The invention provides contact lenses that substantially block either or both UV and blue light from entering the lens wearer's pupil by providing multiple concentric areas of certain materials that decrease or substantially eliminate the UV and blue light transmission. The lenses of the invention accomplish the light blocking without degrading the lens wearer's vision.

8 Claims, 1 Drawing Sheet

CONTACT LENSES WITH LIGHT BLOCKING RINGS

FIELD OF THE INVENTION

The invention relates to contact lenses. In particular, the invention provides contact lenses with multiple rings that filter one or both of ultraviolet ("UV") and blue light.

BACKGROUND OF THE INVENTION

The use of spectacle and contact lenses to correct visual acuity is well known. Although sunglasses useful for decreasing or blocking the eye's exposure to UV light long have been commercially available, comparable contact lenses have not been widely available. However, it is known in the art to provide contact lens with a solid or graded area of light absorbing or light reflecting material to decrease or block UV light rays entering the lens wearer's eye. The solid zones of light absorbing material are disadvantageous in that the lens wearer may see a solid structure, or blockage, within the field of vision when looking through the lens. The graded zone too is disadvantageous in that the gradation can produce scattering of light resulting in a degraded image reaching the retina.

DETAILED DESCRIPTION OF THE INVENTION AND PREFERRED EMBODIMENTS

Figure 1:
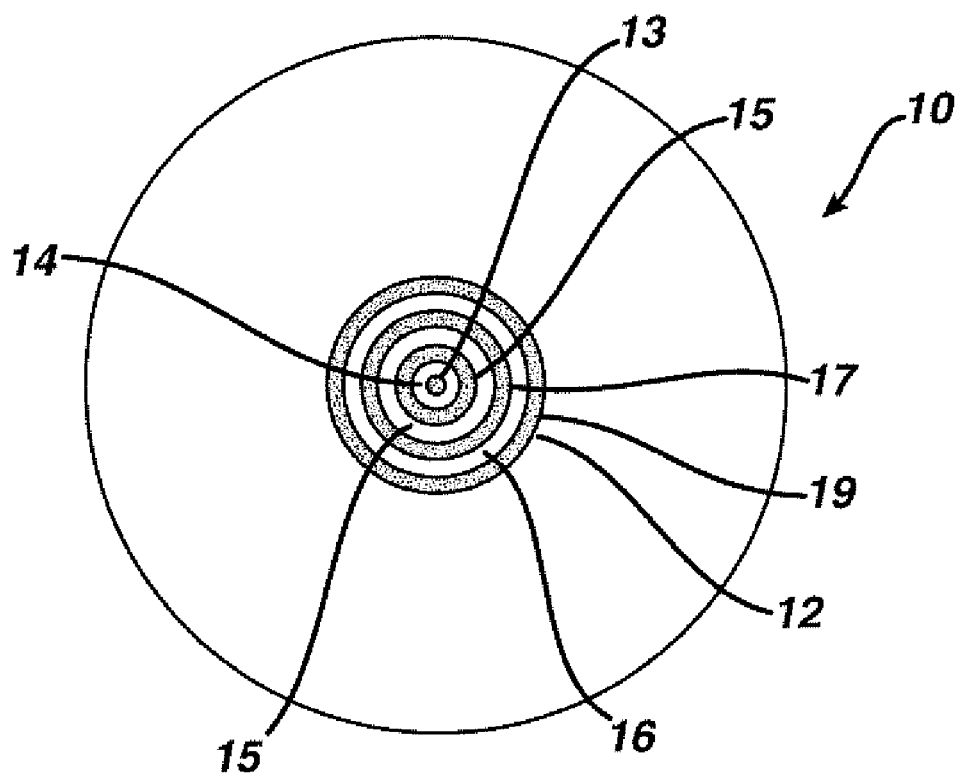
FIG. 1 is a depiction of a lens of the invention.

The invention provides contact lenses, and methods for their manufacture, that substantially block either or both UV and blue light from entering the lens wearer's pupil. It is a discovery of the invention that, by providing multiple concentric rings of certain materials on or in the lens, the amount of selected wavelengths of light may be decreased or substantially eliminated without degrading the lens wearer's vision.

In one embodiment, the invention provides a contact lens at least one surface of which comprises, consists essentially of or consists of an optic zone having a central circular area and at least first and second concentric rings, wherein the central circular area and second ring are capable of substantially blocking the transmittance of UV light, blue light, or both.

By "substantially blocking the transmittance" means that the transmittance of light is less than about 50%, preferably less than about 25%. By "ultraviolet light" or "UV light" is meant light having a wavelength of about 100 to about 400 nm. By "blue light" is meant light having a wavelength of about 400 to about 515 nm.

In FIG. 1 is depicted one embodiment, lens 10, of the invention. Shown is the front, or convex, surface 11 of the lens having optic zone 12. Within optic zone 12 is area 13, a central circular light blocking region centered at the geometric center of lens 10 and surrounded by concentric rings alternating between non-light blocking rings 14, 16, and 18 and light blocking rings 15, 17, and 19.

The area within the optic zone that contains the central circular light blocking region and light blocking rings may be the same size as the optic zone, which in a typical contact lens is about 9 mm or less in diameter. Preferably, the area is less than or equal to 2 mm in diameter. The diameter of the central circular area itself is about 0.3 to about 1 mm. Any number of light blocking rings may surround the central light blocking area and the number of rings and their width will depend on the diameter of the portion of the optic zone containing the light blocking area and rings, with a larger diameter permitting use of more light blocking rings. Preferably, the width of each of the light blocking and non-light blocking rings is about 0.1 mm to about 0.25 mm. Each of the rings may be the same width or a different width than one or more of the other rings. Preferably, the light blocking and non-light blocking rings are spaced equidistant apart.

The central circular light blocking area and surrounding concentric rings may be composed of any suitable material that blocks light transmission to the desired degree. In one embodiment, the central circular area and the light blocking rings are solid colored, or tinted, areas. In an alternative embodiment, the central circular area and rings are composed of opaque dots sized and spaced apart to provide the desired light transmission blocking. For transmittance of light of less than about 50%, opaque dots that are about 0.1 mm in diameter and spaced apart by about 0.029 mm may be used. For transmission of less than about 35%, the same dots are spaced apart by about 0.013 mm.

Suitable colorants include, without limitation, polymerizable colorants such as acryloxy or methacryloxy-substituted 2,4-dihydroxybenzophenonic compounds and non-polymerizable colorants such as 2,2',4,4'-tetrhyroxybenzophenone and 2,2'-dihyroxy-4,4'-dimethoxybenzophenone. Additional colorants include, without limitation, 4-[(2,4-dimethylphenyl)azo]-2,4-dihydro-5-methyl-2-phenyl-3H-pyrazol-3-one, 1,4-bis[(4-methylphenyl)amino]-9,10-anthracendione, and 1, hydroxyl-4-[(4-methylphenyl)amino]-9,10-anthracenedione.

As yet another alternative, reactive dyes may be used. Suitable such dyes include, without limitation, benzene sulfonic acid, 4-(4,5-duhyro-4-((2-methoxy-5-methyl-4-((2-(sulfooxy)ethyl)sulfonyl)pheny 1)azo-3-methyl-5-oxo-1H-orazol-1-yl, [2-mephtahlenesulfonic acid, 7-(acetylamino)-4-hydroxyl-3-((4-sulfooxyethyl)sulfonyl)phenyl)azo], {5-((4,6-dichloro-1,3,5,-triazin-2-yl)amino-4-hydroxy-3-((1-sulfon-2-nephthal enyl_azo-2,7-naphtahlene-disulfonic acid, trisodium salt], copper, 29H, 31H-phthalocyaninato (2-)-$N_{29},N_{30},N_{31},N_{32}$)-sulfo((4-((2-sulfooxy)ethyl)sulfonyl)phenyl)amino)sulfonyl derivative, [2,7-napthalenesulfonic acid, 4-amino-5-hydroxy-3,6-bis((4-((2-(sulfooxy)ethyl)sulfonyl)phenyl)azo)tetrasodium salt, and combinations thereof.

Still another alternative is to organic or inorganic pigment suitable for use in contact lenses, or combinations of such pigments. Illustrative organic pigments include, without limitation, pthalocyanine blue, pthalocyanine green, carbazole violet, vat orange #1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available.

The dye or pigment selected may be combined with one or more of a pre-polymer, or binding polymer, and a solvent to form the colorant used to produce the translucent and opaque layers used in the lenses of the invention. Other additives useful in contact lens colorants also may be used. The binding polymers, solvents, and other additives useful in the color layers of the invention are known and either commercially available or methods for their making are known.

In another embodiment, the central circular area and light blocking rings providing the UV blocking may be formed from a photochromic compound or composition, which compounds and compositions are well known. The photochromic materials include, without limitation, the following classes of materials: chromenes, such as naphthopyrans, benzopyrans, indenonaphthopyrans and phenanthropyrans; spiropyrans, such as spiro (benzindoline) naphthopyrans, spiro (indoline) benzopyrans, spiro (indoline) naphthopyrans, spiro (indoline) quinopyrans and spiro (indoline) pyrans; oxazines, such as spiro (indoline) naphthoxazines, spiro (indoline) pyridobenzoxazines, spiro (benzindoline) pyridobenzoxazines, spiro (benzindoline) naphthoxazines and spiro (indoline) benzoxazines; mercury dithizonates, fulgides, fulgimides and mixtures of such photochromic compounds.

Additional suitable photochromic materials include, without limitation, organo-metal dithiozonates, such as (arylazo)-thioformic arylhydrazidates, e.g., mercury dithizonates; and fulgides and fulgimides, naphthoxazines, spirobenzopyrans; polymerizable spirobenzopyrans and spirobenzopyrans; polymerizable fulgides; polymerizable naphthacenediones; polymerizable spirooxazines; and polymerizable polyalkoxylated napthopyrans. The photochromic materials may be used alone or in combination with one or more other appropriate and complementary photochromic materials.

Still other useful photochromic materials include an indeno-fused naphthopyran chosen from an indeno[2',3':3,4]naphtho[1,2-b]pyran and an indeno[1',2':4,3]naphtho[2,1-b]pyran, wherein the 13-position of the indeno-fused naphthopyran is unsubstituted, mono-substituted or di-substituted, provided that if the 13-position of the indeno-fused naphthopyran is di-substituted, the substituent groups do not together form norbornane; and (ii) a group that extends the pi-conjugated system of the indeno-fused naphthopyran bonded at the 11-position thereof, where said group is a substituted or unsubstituted aryl, a substituted or unsubstituted heteroaryl, or a group represented by —X=Y or —X'≡Y', wherein X, X', Y and Y' are as described herein below and as set forth in the claims; or the group that extends the pi-conjugated system of the indeno-fused naphthopyran together with a group bonded at the 12-position of the indeno-fused naphthopyran or together with a group bonded at the 10-position of the indeno-fused naphthopyran form a fused group, provided the fused group is not a benzo fused group, which are more specifically disclosed in U.S. Ser. No. 11/102,047, entitled OPHTHALMIC DEVICES COMPRISING PHOTOCHROMIC MATERIALS HAVING EXTENDED PI-CONJUGATED SYSTEMS AND COMPOSITIONS AND ARTICLES INCLUDING THE SAME filed on Apr. 8, 2005. Yet other n suitable photochromic compounds are naphthopyrans having reactive groups, such as those more specifically disclosed in U.S. Ser. No. 11/101,979, entitled OPHTHALMIC DEVICES COMPRISING PHOTOCHROMIC MATERIALS WITH REACTIVE SUBSTITUENTS filed on Apr. 8, 2005. Specific non-limiting examples of suitable photochromic compounds are shown in the formula below:

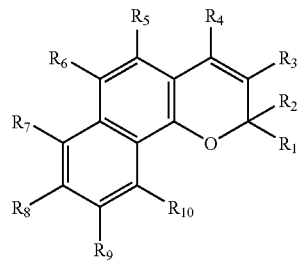

In which $R_1$ through $R_{10}$ may comprise H, a monosubstituted alkyl or aryl group, which may optionally comprise a heteroatom such as O, N or S, al alkenyl or alkynyl group, and which may in combination form fused or unfused rings, provided that one or more R group comprises a polymerizable group, such as a methacrylate, acrylate, acrylamide, methacrylamide, fumarate, styryl, N-vinyl amide group, preferably a methacrylate group. Specific non-limiting examples of suitable naphthopyran compounds include those described in:

Photochromic compound I

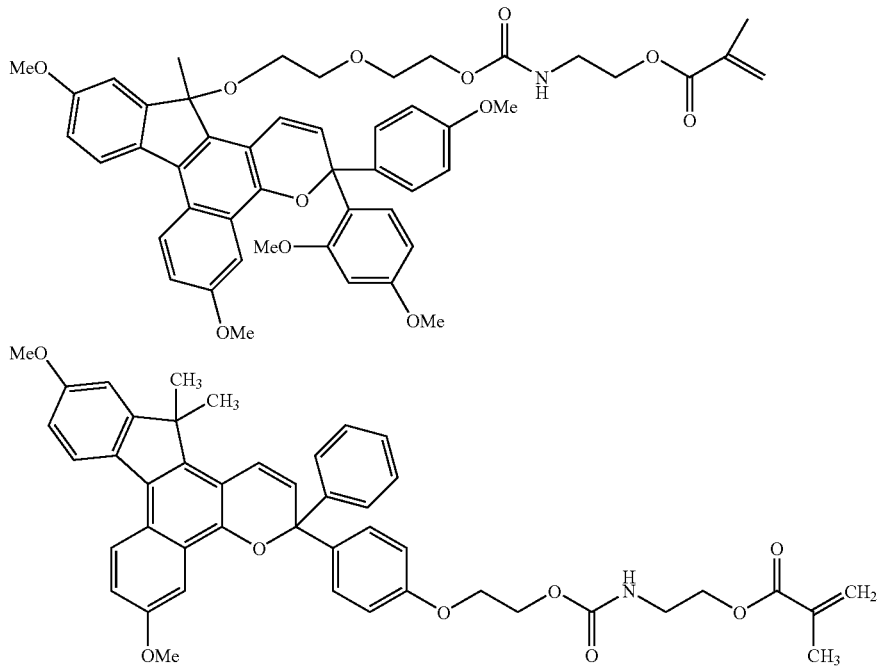

Photochromic compound II
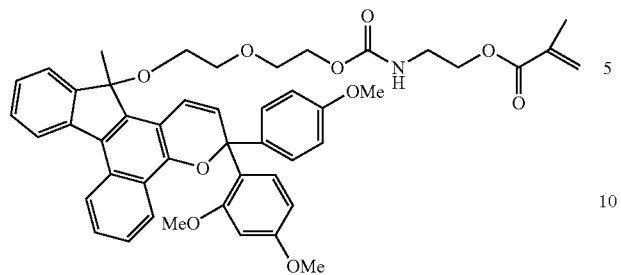
Photochromic compound III
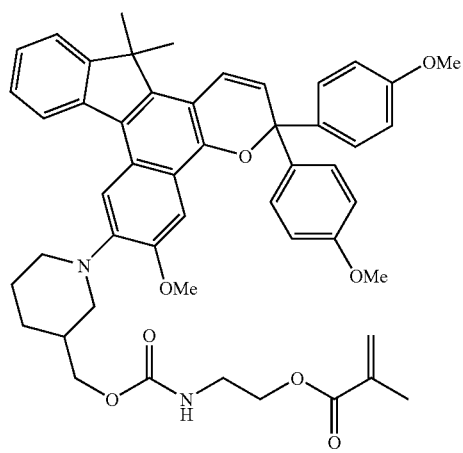
Photochromic compound IV
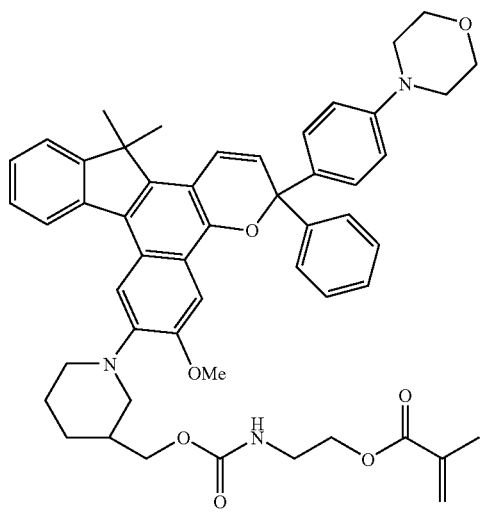
Photochromic compound V
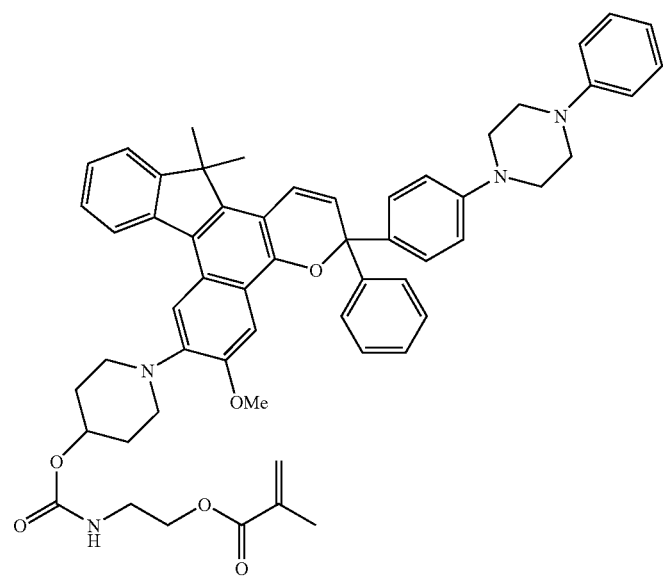

Photochromic compound VI
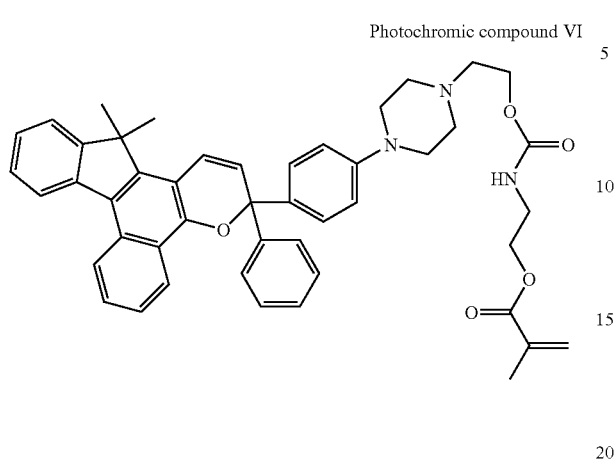
Photochromic compound VII
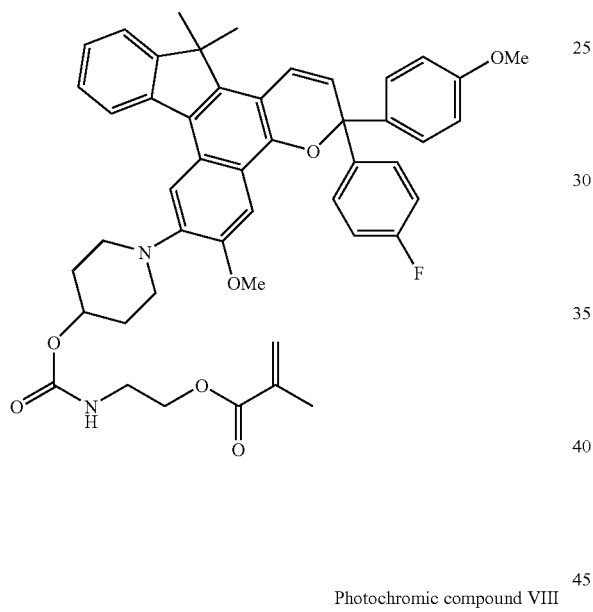
Photochromic compound VIII
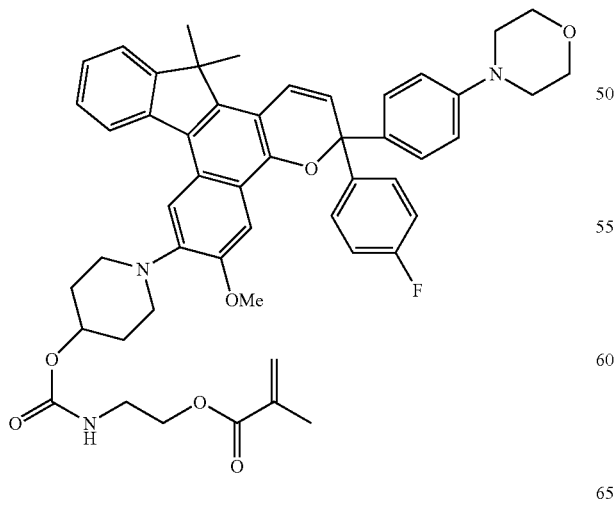
Photochromic compound IX
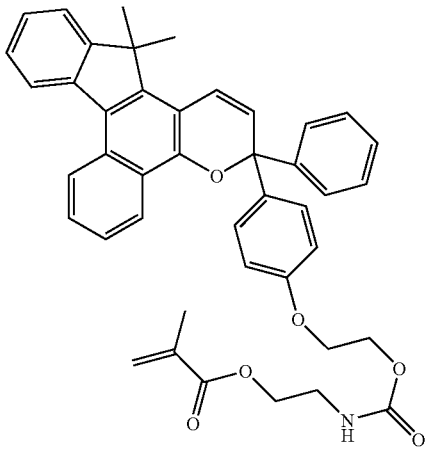
Photochromic compound X
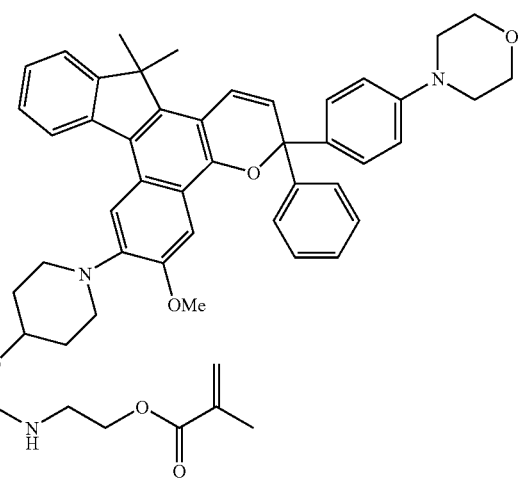
Photochromic compound XI
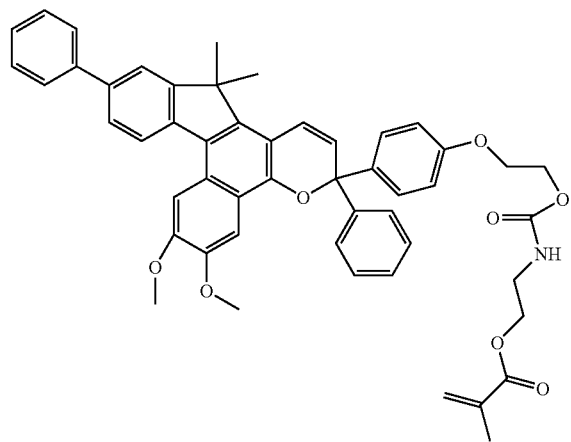

Photochromic compound XII

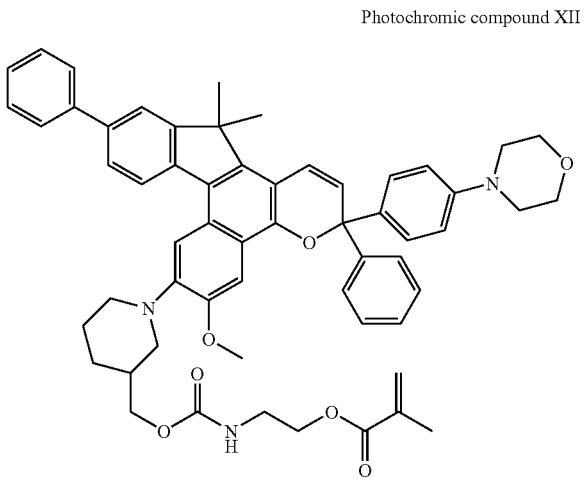

The amount of colorant, dye, pigment or photochromic material used will be that effective to achieve the UV light blocking, blue light blocking, or both desired. The particular amount used also will depend upon the lens material selected as well as the thickness of the lens.

The invention may be used to provide hard or soft contact lenses made of any known lens material, or material suitable for manufacturing such lenses. Preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers. Examples of such silicone macromers include, without limitation, polydimethylsiloxane methacrylated with pendant hydrophilic groups; polydimethylsiloxane macromers with polymerizable function and combinations thereof. They may also be made using polysiloxane macromers incorporating hydrophilic monomers; or macromers comprising polydimethylsiloxane blocks and polyether blocks.

Suitable materials also may be made from combinations of oxyperm and ionoperm. Hydrophilic monomers may be incorporated into such copolymers, including 2-hydroxyethyl methacrylate ("HEMA"), 2-hydroxyethyl acrylate, N,N-dimethylacrylamide ("DMA"), N-vinylpyrrolidone, 2-vinyl-4,4-dimethyl-2-oxazolin-5-one, methacrylic acid, and 2-hydroxyethyl methacrylamide. Additional siloxane monomers may be incorporated such as tris(trimethylsiloxy)silylpropyl methacrylate, or the siloxane monomers.

The materials for making the contact lenses are well known and commercially available. In one non-limiting embodiment, the material used is a HEMA based hydrogel, more preferably etafilcon A, and the binding polymer is formed from linear random block copolymers of MAA, HEMA and lauryl methacrylate ("LMA"); linear random block copolymers of MAA and HEMA; linear random block copolymers of HEMA and LMA; or a HEMA homopolymer. Etafilcon A, generally is a formulation of 100 parts by weight ("pbw") HEMA, about 1.5 to about 2.5 pbw MAA, approximately 0.3 to about 1.3 pbw ethylene glycol dimethacrylate, about 0.05 to about 1.5 pbw 1,1,1,-trimethylolpropane trimethacrylate, and about 0.017 to about 0.024 pbw of a visibility tint. Preferably etafilcon A is used with a linear random block copolymer of MAA, HEMA and LMA in a ratio of 0.47 MAA to 100 HEMA to 4.14 LMA, or with a linear random block copolymer of HEMA and MAA in a ratio of 99.9 HEMA and 0.1 MAA to 99.5 HEMA and 0.5 MAA.

The central circular light blocking area and rings may be applied to, or printed on, one or more surfaces of a lens or may be printed onto one or more surfaces of a mold into which a lens forming material will be deposited and cured. In a preferred method for forming lenses incorporating the designs of the invention, a thermoplastic optical mold, made from any suitable material including, without limitation, cyclic polyolefins and polyolefins such as polypropylene, polystyrene resin, cycloolefin-based polymers such as TOPAS, which is an amorphous copolymer based on cycloolefins and ethylene, commercially available from Ticona, polymers made by ring-opening metathesis polymerization of norbornene compounds followed by hydrogenation, such as Zeonor, which is commercially available from Zeon Corporation, glass, metal, or quartz may be used. The light blocking area and rings are deposited onto the desired portion of the molding surface of the mold. By "molding surface" is meant the surface of a mold or mold half used to form a surface of a lens. The deposition may be carried out by spraying, pad printing, tampo printing, brushing or stamping. Preferably, the deposition is carried out by pad printing as follows.

A metal plate, preferably made from steel and more preferably from stainless steel, is covered with a photo resist material that is capable of becoming water insoluble once cured. The central light blocking area and rings are designed and then reduced to the desired size using any of a number of techniques such as photographic techniques, placed over the metal plate, and the photo resist material is cured.

The plate is subsequently washed with an aqueous solution and the resulting image is etched into the plate to a suitable depth, for example about 20 microns. A colorant containing a binding polymer, solvent, and pigment or dye is then deposited onto the elements to fill the depressions with colorant. A silicon pad of a geometry suitable for use in printing on the surface and varying hardness, generally about 1 to about 10, is pressed against the image on the plate to remove the colorant and the colorant is then dried slightly by evaporation of the solvent. The pad is then pressed against the molding surface of an optical mold. The mold is degassed for up to 12 hours to remove excess solvents and oxygen after which the mold is filled with lens material. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

In a preferred embodiment, a clear, pre-polymer layer is used, which pre-polymer layer overlays at least the central circular light blocking area and light blocking rings and preferably forms the entirety of the lens' outermost surface.

The invention claimed is:

1. A contact lens, comprising an optic zone having a central circular area and first, second, third, fourth, fifth and sixth concentric rings therearound, wherein the central circular area and second, fourth, and sixth rings are capable of substantially blocking the transmittance of UV light, blue light, or both.

2. The lens of claim 1, wherein the central circular area is centered at a geometric center of the lens and has a diameter of about 0.3 to about 1 mm.

3. The lens of claim 2, wherein a width of each of the rings is about 0.1 mm to about 0.25 mm.

4. The lens of claim 1, wherein a width of each of the rings is about 0.1 mm to about 0.25 mm.

5. The lens of claim 1, wherein the central circular area and the light blocking rings comprise solid colored areas.

6. The lens of claim 1, wherein the central circular area and rings comprise opaque dots.

7. The lens of claim 6, wherein the dots have a diameter of about 0.1 mm and are spaced apart by about 0.029 mm.

8. A method for providing light blocking contact lens, comprising the step of providing a contact lens having an optic zone comprising a central circular area and first, second, third, fourth fifth and sixth concentric rings therearound, wherein the central circular area and second fourth and sixth rings are capable of substantially blocking the transmittance of UV light, blue light, or both.

* * * * *